May 20, 1941.　　　M. R. PHIPPS　　　2,242,543
SWAB
Filed May 25, 1940

Inventor
Mabel R. Phipps,
By G. C. Kennedy
Attorney

Patented May 20, 1941

2,242,543

UNITED STATES PATENT OFFICE 2,242,543

SWAB

Mabel R. Phipps, Waterloo Township, Blackhawk County, Iowa

Application May 25, 1940, Serial No. 337,159

1 Claim. (Cl. 15—147)

My invention relates to improvements in swabs and the like, and particularly to such devices as are used in cleansing utensils for household use, and the principal object of my improvements is the provision of a clamping tool for a swab which is constructed for quick assemblage or separation of its clamping elements about the swab.

Another object of my improvements is to supply separable clamping members mounted upon a handle removably, the embracing members for a swab between them having separable lockable coacting means at their free terminations.

Another object of my improvements is the use of an elastic holder socketed for mounting upon a handle separably, the holder having a pair of terminal gripping devices, also elastic, and having coacting locking end means for embracing a traversing swab, releasably and quickly separable.

I have accomplished the above objects by the means which are hereinafter fully illustrated, described and claimed.

Figure 1:
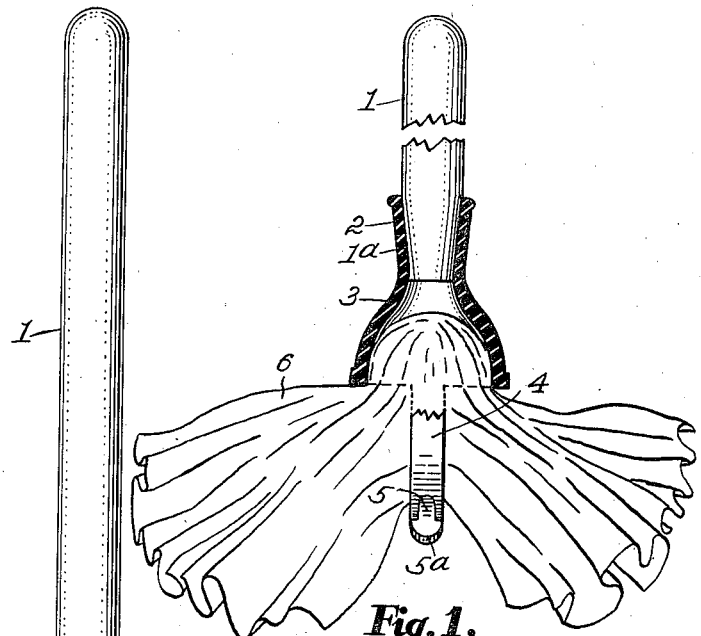
Figure 2:
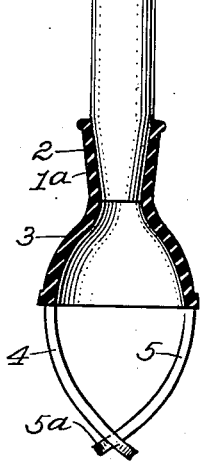
Figure 3:
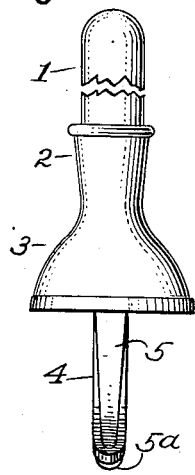
Figure 4:
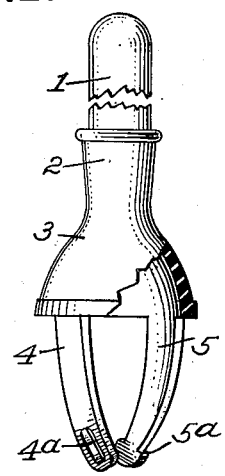
Figure 5:
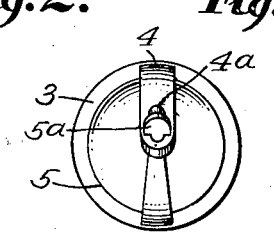

Fig. 1 is a side elevation of my improved swab holder, with parts broken away or in longitudinal section, and in which is shown the coacting devices for removably embracing and holding a traversing swab. Fig. 2 is another side elevation of my swab holder, without the swab, the arms of the cupped receptacle being shown with their ends releasably connected, and the receptacle shown in medial longitudinal section. Fig. 3 is an elevation of the device, with a portion of the handle broken away, and the pair of end engaged elastic arms positioned ninety degrees around relative to their positions shown in Fig. 2. Fig. 4 is an elevation of the device similar to that of said Fig. 3, with a part broken away, and the arms disconnected from each other and turned about at a less angle of rotation. Fig. 5 is an end elevation of the open extremity of the elastic cup, showing the outer terminations of the arms end-connected releasably.

My improved device comprises in combination, a handle 1 having one end coned at 1a and seated removably in a hollow rubber coned stem 2 which is integral, preferably, with an open end part 3 of semi-oval shape, also hollow, and having a pair of equally spaced rubber arms 4 and 5, opposite to each other and projecting longitudinally from the cup 3. As shown in the figures said arms are preferably shaped to curve inwardly toward each other, although they may extend apart differently. In Fig. 4 this arrangement is shown, with the extreme end parts of the arms disconnected. The arm 4 has a short longitudinal slot 4a, while the other arm 5 is narrowed flatly in shape toward its outer extremity which latter is shaped and widened transversely to provide opposite lateral detents 5a. In Figs. 1, 2, 3 and 5 the outer ends of the arms are shown connected. In Fig. 1, said arms are likewise connected and inclosing a traversing swab 6 medially graspingly. In the latter case the compression by said arms upon the swab seats its middle part tightly in its rubber seat or cup 3, preventing displacements of the swab.

The outer terminations of said arms may be releasably connected by giving the outer termination of the arm 5 a one quarter twist to permit it with its lateral detents passage through the longitudinal slot 4a on the arm 4, and the narrowed neck part of the arm 5 at its detents 5a will permit the rocking back of the detents by reaction to clamp the detents transversely or by compulsion against the arm 4 interlockingly, as shown in all of the figures but Fig. 4.

As thus connected around the middle part of the traversing swab 6, tightly, the swab is locked into the cup 3, while the reversal of operations on the arms may be effected in releasing them.

It will be understood, that the connections and separations of these arms are instantly accomplished, for removal of the swab or the substitution of another.

It should also be understood, that various changes may be effected in the several parts or components of the device, without thereby departing from the principles of the invention and of its operations.

I claim:

A swab device, comprising in combination, an elongated stem having a conical end, and elastic bowl having a conical neck fitting said stem end, the bowl also having an outwardly directed terminal rim, opposite flattened incurved arms extending forwardly and integrally from the terminal rim, one arm being of even width with a narrow oblong opening extending lengthwise in its terminal part, and the opposite arm being gradually narrowed outwardly to a termination set off transversely outwardly angularly and having an arcuate end, whereby its offset widened termination may be torsionally bent rectangularly to traverse the oblong opening in the first arm and then rebent to its first position releasably locking to clamp releasably a medial flexible part of a swab device positioned in part in the bowl and in part by said arms.

MABEL R. PHIPPS.